US00RE50848E

(19) United States
(12) Reissued Patent
Schilling

(10) Patent Number: US RE50,848 E
(45) Date of Reissued Patent: Mar. 31, 2026

(54) GAS TURBINE ENGINE ASSEMBLY AND METHOD OF ASSEMBLING SAME

(71) Applicant: General Electric Company, Schenectady, NY (US)

(72) Inventor: Jan Christopher Schilling, Liberty Township, OH (US)

(73) Assignee: General Electric Company, Schenectady, NY (US)

(21) Appl. No.: 17/725,458

(22) Filed: Apr. 20, 2022

Related U.S. Patent Documents

Reissue of:
(64) Patent No.: 7,694,505
Issued: Apr. 13, 2010
Appl. No.: 11/461,019
Filed: Jul. 31, 2006

(51) Int. Cl.
*F02K 3/06* (2006.01)
*F02C 7/36* (2006.01)

(52) U.S. Cl.
CPC ..... *F02K 3/06* (2013.01); *F02C 7/36* (2013.01); *F05D 2260/40311* (2013.01)

(58) Field of Classification Search
CPC .... F02K 3/06; F02K 3/072; F02C 7/36; F02C 3/067; F02C 3/107; F05D 2260/40311; F05D 2220/36
See application file for complete search history.

(56) References Cited

U.S. PATENT DOCUMENTS 2,936,655 A 5/1960 Peterson et al.
3,021,731 A 2/1962 Stoeckicht
3,352,178 A 11/1967 Lindgren et al.
3,673,802 A 7/1972 Krebs et al.
4,084,861 A 4/1978 Greenberg et al.
4,090,416 A 5/1978 Hicks
4,251,987 A 2/1981 Adamson
(Continued)

FOREIGN PATENT DOCUMENTS

GB 2419639 A 5/2006
GB 2426792 A 12/2006

OTHER PUBLICATIONS

Brines, "The turbofan of tomorrow." *Mechanical Engineering* 112(8): 65, Aug. 1990.

(Continued)

*Primary Examiner* — Peter C English
(74) *Attorney, Agent, or Firm* — Klarquist Sparkman, LLP

(57) ABSTRACT

A [method of assembling a] gas turbine assembly includes [providing] a core gas turbine engine including a high-pressure compressor, a combustor, and a turbine[, coupling a]. *A* low-pressure turbine *is* axially aft from the core gas turbine engine, [coupling] a fan assembly *is* axially forward from the core gas turbine engine, [and coupling] a booster compressor *is coupled* to the low-pressure turbine such that the booster compressor and the low-pressure turbine rotate at a first rotational speed*, and an epicyclic gearbox is coupled to the low-pressure turbine and the fan assembly such that the fan assembly rotates at a second rotational speed.*

11 Claims, 2 Drawing Sheets

Amended

(56) References Cited

U.S. PATENT DOCUMENTS

| | | | | |
|---|---|---|---|---|
| 4,289,360 | A | 9/1981 | Zirin | |
| 4,474,001 | A | 10/1984 | Griffin et al. | |
| 4,914,904 | A | 4/1990 | Parnes et al. | |
| 4,916,894 | A * | 4/1990 | Adamson et al. | F02K 3/04 416/171 |
| 4,969,325 | A | 11/1990 | Adamson et al. | |
| 5,010,729 | A | 4/1991 | Adamson et al. | |
| 5,081,832 | A | 1/1992 | Mowill | |
| 5,361,580 | A | 11/1994 | Ciokajlo et al. | |
| 5,433,584 | A | 7/1995 | Amin et al. | |
| 5,433,674 | A | 7/1995 | Sheridan et al. | |
| 5,466,198 | A | 11/1995 | McKibbin et al. | |
| 6,073,439 | A | 6/2000 | Beaven et al. | |
| 6,158,210 | A | 12/2000 | Orlando | |
| 6,223,616 | B1 | 5/2001 | Sheridan | |
| 6,619,030 | B1 * | 9/2003 | Seda et al. | 60/226.1 |
| 6,625,989 | B2 | 9/2003 | Boeck | |
| 6,990,797 | B2 * | 1/2006 | Venkataramani et al. | F02C 7/047 60/39.093 |
| 7,021,042 | B2 | 4/2006 | Law | |
| 7,096,674 | B2 | 8/2006 | Orlando et al. | |
| 7,334,392 | B2 * | 2/2008 | Moniz et al. | 60/204 |
| 7,591,754 | B2 | 9/2009 | Duong et al. | |
| 7,704,178 | B2 | 4/2010 | Sheridan et al. | |
| 2004/0168427 | A1 | 9/2004 | Truco et al. | |
| 2005/0210863 | A1 | 9/2005 | Wollenweber et al. | |
| 2006/0090449 | A1 | 5/2006 | Moniz et al. | |
| 2006/0090451 | A1 | 5/2006 | Moniz et al. | |
| 2007/0084184 | A1 * | 4/2007 | Orlando et al. | F01D 1/26 60/226.1 |
| 2007/0084187 | A1 * | 4/2007 | Moniz et al. | F02C 7/06 60/226.1 |
| 2008/0006018 | A1 * | 1/2008 | Sheridan et al. | F02C 7/36 60/39.1 |

OTHER PUBLICATIONS

Cusick, *Avco Lycoming's ALF 502 high bypass fan engine*. No. 810618. SAE Technical Paper, 1981.

Das et al., "An analytical method to calculate misalignment in the journal bearing of a planetary gear system," *Wear* 61(1): 143-156, Jun. 1980.

Dudley, "Gear Handbook: The Design, Manufacture and Application of Gears," 1962 (excerpts).

Gunston, *Pratt & Whitney PW8000*, Jane's Aero-Engines Issue 7, Mar. 2000.

Hess, "Pratt & Whitney develops geared turbofan." *Flug Revue* 43(7): 1-19, Oct. 1998.

Kandebo, "Pratt and Whitney launches geared turbofan engine." *Aviation Week and Space Technology* 148 (8): 32-34, Feb. 1998.

Lynwander, "Gear Drive Systems. Design and Application" Marcel Dekker, Inc. New York and Basel, 1983.

Mancuso et al., "What are the differences in high performance flexible couplings for turbomachinery," In *Proceedings of the 32nd Turbomachinery Symposium*. Texas A&M University. Turbomachinery Laboratories, 2003.

McCune, "Initial test results of 40,000 horsepower fan drive gear system for advanced ducted propulsion systems," In *29th Joint Propulsion Conference and Exhibit*, p. 2146, Jun. 1993.

Quiet Clean Short-Haul Experimental Engine (QCSEE) Main Reduction Gears Test Program Final Report, NASA CR-134669, Mar. 1977.

Quiet Clean Short-Haul Experimental Engine (QCSEE) Preliminary Under the Wing Flight Propulsion System Analysis Report, NASA CR-134868, 1976.

Quiet Clean Short-Haul Experimental Engine (QCSEE) Under-the-Wing (UTW) Final Design Report, N80-75348, 1977.

Quiet, Powered-Lift Propulsion, NASA Conference Publication 2077 Nov. 14-15, 1978.

Dudley al., "Handbook of practical gear design," , Technomic Publishing Co., Inc. 1994 (excerpts).

Sweetman, B., and O. Sutton. "Pratt & Whitney's surprise leap." *Interavia Business and Technology* 53: 25-26, 1998.

Wendus et al., *Follow-on technology requirement study for advanced subsonic transport*, No. NASA/CR-2003-212467, Aug. 2003.

Willis, *Quiet Clean Short-Haul Experimental Engine* (*QCSEE*) Final Report. No. NASA-CR-159473, 1979.

* cited by examiner

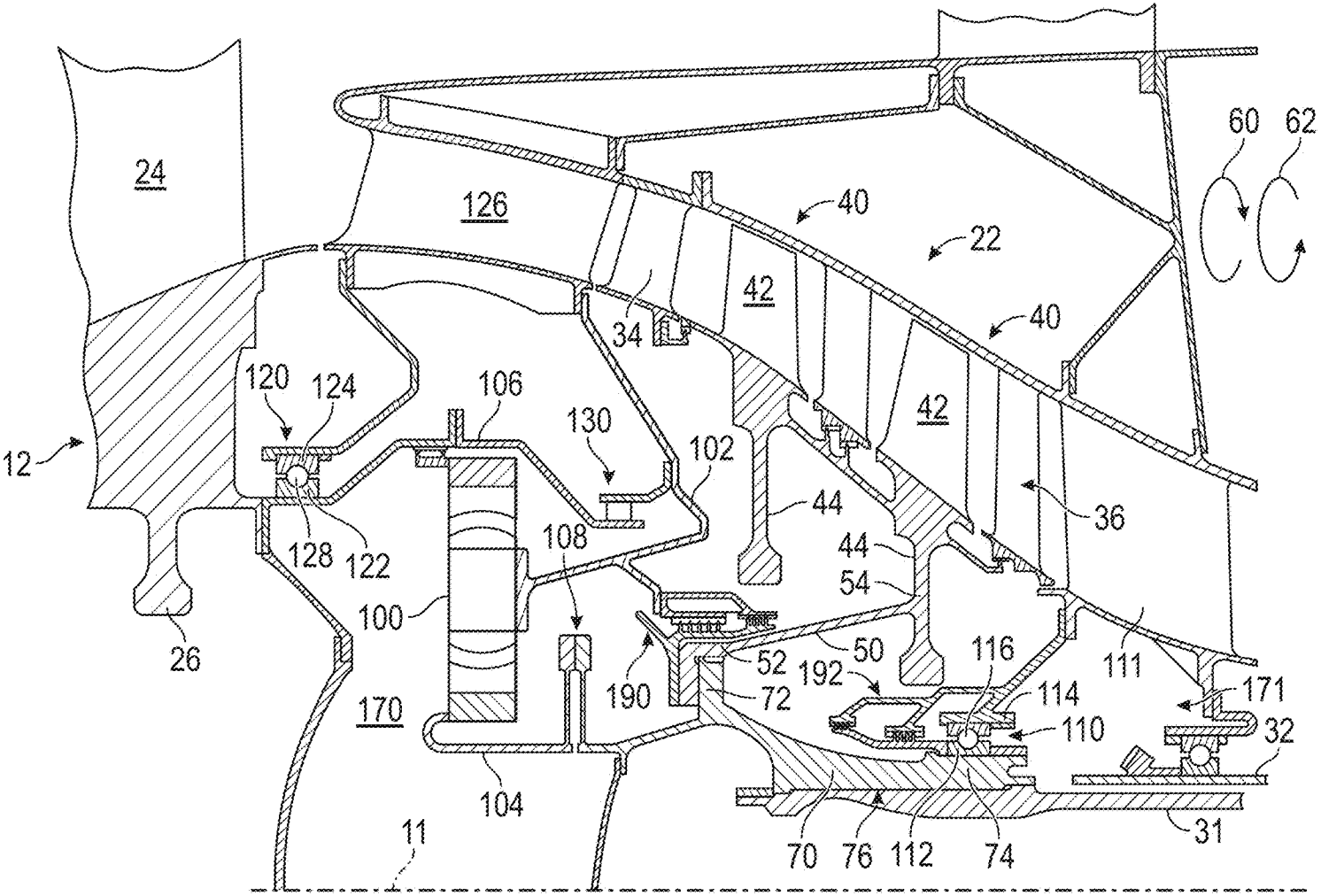
FIG. 2
Amended

GAS TURBINE ENGINE ASSEMBLY AND METHOD OF ASSEMBLING SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

This invention relates generally to gas turbine engines, and more specifically to gas turbine engine assemblies and methods of assembling the same.

At least some known gas turbine engines include a fan assembly, a core engine, and a low-pressure or power turbine. The core engine includes at least one compressor, a combustor, and a high-pressure turbine that are coupled together in a serial flow relationship. Air entering the core engine is mixed with fuel and ignited to form a high energy gas stream. The high energy gas stream flows through the high-pressure turbine to rotatably drive the high-pressure turbine and thus the compressor via a first drive shaft. The gas stream expands as it flows through the high-pressure turbine to facilitate driving the low-pressure turbine which rotatably drives the fan assembly through a second drive shaft.

To improve engine efficiency, it is desirable to operate the fan assembly at a relatively low speed to improve fan efficiency and to operate the [high-pressure] *low-pressure* turbine at a relatively high speed to improve turbine efficiency. Accordingly, neither the fan speed nor the [high-pressure] *low-pressure* turbine speed may be totally optimized to improve overall engine efficiency.

As such, at least one known gas turbine engine includes a gearbox coupled between the low-pressure turbine and the fan assembly to facilitate reducing the operational speed of the fan assembly. However, utilizing a gearbox to reduce the speed of the fan assembly and thus increase the efficiency of the fan assembly reduces the quantity of airflow channeled to the booster compressor. As a result, additional stages may be added to the booster compressor to achieve proper pressure, thus increasing the overall weight, design complexity and/or manufacturing costs of such an engine.

BRIEF DESCRIPTION OF THE DRAWINGS

FIG. 2 is an enlarged cross-sectional view of a portion of the turbine engine assembly shown in FIG. 1.

DETAILED DESCRIPTION OF THE INVENTION

Figure 1:
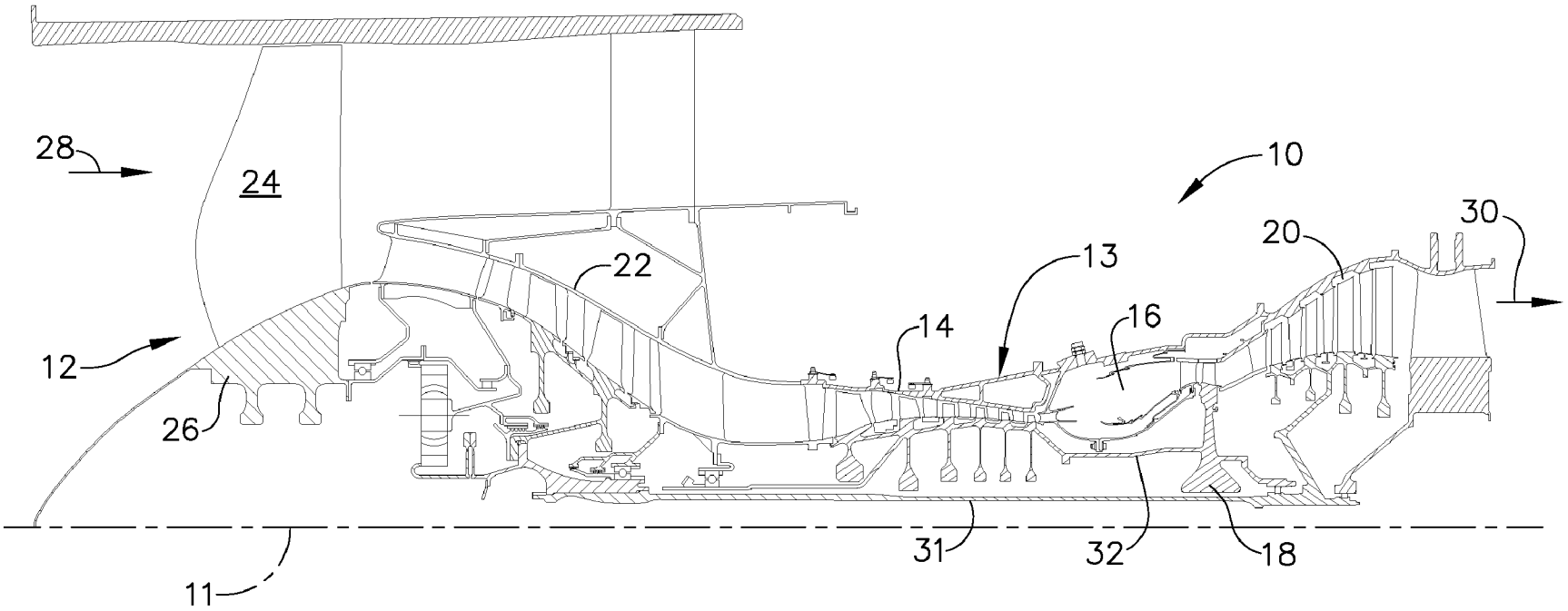
FIG. 1 is a cross-sectional view of a portion of an exemplary turbine engine assembly.

FIG. 1 is a schematic illustration of an exemplary gas turbine engine assembly 10 having a longitudinal axis 11. Gas turbine engine assembly 10 includes a fan assembly 12, and a core gas turbine engine 13 that includes a high-pressure compressor 14, a combustor 16, and a high-pressure turbine 18. In the exemplary embodiment, gas turbine engine assembly 10 also includes a low-pressure turbine 20 and a booster compressor 22 (*also referred to as booster 22 herein*).

Fan assembly 12 includes an array of fan blades 24 extending radially outward from a rotor disk 26. Engine 10 has an intake side 28 and an exhaust side 30. Booster 22 and low-pressure turbine 20 are coupled together by a first drive shaft 31, and compressor 14 and high-pressure turbine 18 are coupled together by a second drive shaft 32. Fan assembly 12 is supported on a novel frame 126 and driven by shaft 31 through reduction gearbox 100.

FIG. 2 is a schematic diagram of a portion of gas turbine engine assembly 10 shown in FIG. 1. As shown in FIG. 2, booster 22 includes a plurality of circumferentially-spaced inlet guide vanes (IGV) 34 to facilitate channeling airflow entering gas turbine engine 10 downstream through booster 22. In the exemplary embodiment, gas turbine engine assembly 10 also includes a plurality of outlet guide vane (OGV) assemblies 36 that are coupled downstream from booster compressor 22. In one embodiment booster 22 includes less than four stages 40 of rotor blades 42 that are each coupled to a respective rotor disk 44. In the exemplary embodiment, booster compressor 22 includes two stages 40 of rotor blades 42.

In the exemplary embodiment, booster 22 is coupled to low-pressure turbine 20 via shaft 31. For example, in the exemplary embodiment, gas turbine engine 10 includes a cone or disk 50 that is connected at a first or forward end 52 [driven by] *to a shaft extension 70, which is coupled to* shaft 31 utilizing a plurality of splines 76, and at a second or aft end 54 to *aft* disk 44, as shown in FIG. 2. As such, booster 22 is coupled to low-pressure turbine 20 such that booster 22 and low-pressure turbine *20* rotate at the same rotational speed in a first rotational direction 60. More specifically, gas turbine engine 10 includes [a]*the* shaft extension 70 that includes a first or forward end 72 that is coupled to disk 50 and a second or aft end 74 that is coupled to drive shaft 31, and thus low-pressure turbine 20 via splines 76.

In the exemplary embodiment, gas turbine engine 10 also includes a gearbox 100 that is coupled between fan assembly 12 and drive shaft 31 to facilitate rotating fan assembly 12. In one embodiment, gearbox 100 is an epicyclical gearbox that is configured to rotate fan assembly 12 in opposite rotational direction 62 with respect to rotational direction 60 in which low-pressure turbine 20 and booster 22 each rotate. Gearbox 100 has a generally toroidal shape and is configured to be positioned circumferentially about drive shaft 31 to extend substantially about drive shaft 31. As shown in FIG. 2, gear-box 100 includes a support structure 102 that is configured to provide structural support to gearbox 100 such that gearbox 100 is maintained in a substantially fixed position within gas turbine engine 10. As such, gearbox 100 includes an input 104 that is coupled to shaft 31 via shaft extension 70 and an output 106 that is coupled to fan assembly 12 to facilitate driving fan assembly 12.

In the exemplary embodiment, gas turbine engine 10 also includes a flex connection 108 that is coupled between input 104 and shaft extension 70 to facilitate providing both axial and radial support between gearbox 100 and shaft 31. For example, during operation, flex connection 108 may absorb any rotational torque that is transmitted between gearbox 100 and shaft 31 to facilitate extending the operational life of both gearbox 100 and shaft 31. Moreover, flex connection 108 may also be utilized to facilitate aligning gearbox 100 and shaft 31 during engine operation.

In one embodiment, gearbox 100 has a gear ratio of approximately 2.0 to 1 such that fan assembly 12 rotates at a rotational speed that is approximately one-half the rotational speed of low-pressure turbine 20.

A first bearing assembly, such as thrust bearing assembly 110, is positioned about drive shaft 31 and/or longitudinal axis 11. Thrust bearing assembly 110 operatively couples and/or is mounted between drive shaft 31 and a frame 111 of core gas turbine engine 13. Thrust bearing assembly 110 includes a radially positioned inner race 112 that is mounted with respect to drive shaft 31. As shown in FIG. 2, inner race 112 is mounted to drive shaft extension 70 operatively coupled to drive shaft 31 so that inner race 112 is rotatable about longitudinal axis 11 with drive shaft 31. Bearing assembly 110 also include a radially outer race 114 that is coupled to frame 111 and acts as a ground for the transfer of thrust loads and/or forces developed or generated by gearbox 100, and at least one roller element, such as a plurality of bearings 116 that are movably positioned between inner race 112 and outer race 114.

A second bearing assembly, such as thrust bearing assembly 120, is positioned between fan assembly 12 and gearbox output 106. As such, thrust bearing assembly 120 operatively couples fan assembly 12 to gearbox 100 and acts to ensure that thrust loads and/or forces developed or generated by fan assembly 12 are not transferred to gearbox 100. Thrust bearing assembly 120 includes a radially positioned inner race 122 that is mounted with respect to gearbox output 106 and a radially outer race 124 that is coupled to a frame 126 and acts as a ground for the transfer of thrust loads and/or forces developed or generated by fan assembly 12, and at least one roller element, such as a plurality of bearings 128 that are movably positioned between inner race 122 and outer race 124. Frame 126 carries the fan radial, thrust, and overturning moment generated from bearing 128 and 136. Frame 126 also transfers these loads to the outer engine structure and mounts. By use of frame 126, frame 111 can be minimized with respect to [its'] *its* overall axial dimensions thus minimizing weight of the engine system.

As a result of transferring thrust loads and/or forces to thrust bearing assembly 120, the transfer of thrust loads and/or forces through gearbox 100, operatively coupled to fan assembly 12, is prevented or limited. In alternative embodiments, any suitable bearing assembly known to those skilled in the art and guided by the teachings herein provided can be used for, or in addition to, bearing assembly 110 and/or bearing assembly 120.

To facilitate maintaining gearbox output 106 [is] *in* a substantially fixed radial position, gas turbine engine assembly 10 also include a roller bearing assembly 130 that is coupled between gearbox output 106 and support structure 102. Specifically, bearing assembly 130 includes a rotating inner race [132] that is coupled to gearbox output 106, a stationary [inner] *outer* race that is coupled to support structure 102, and a plurality of roller elements [136] that are positioned between *the* inner and outer races [132 and 134, respectively].

In the exemplary embodiment, thrust bearing assembly 120 and roller bearing assembly 130 facilitate providing rotational support to fan assembly 12 such that fan assembly 12 and gearbox output 106 may rotate freely with respect to support structure 102[and 106]. Accordingly, bearing assemblies 120 and 130 facilitate maintaining fan assembly 12 in a relatively fixed radial position within gas turbine engine assembly 10.

In the exemplary embodiment, gas turbine engine assembly 10 also includes a first pair of labyrinth seals 190 that facilitate sealing an upstream side of booster 22 from sump 170, and a second pair of labyrinth seals 192 that facilitate sealing a downstream side of booster 22 from sump 171.

To assemble gas turbine engine 10, a core gas turbine engine including a high-pressure compressor, a combustor, and a turbine is provided. A low-pressure turbine is coupled axially aft from the core gas turbine engine, and a fan assembly is coupled axially forward from the core gas turbine engine. The booster compressor is then coupled to the low-pressure turbine such that the booster compressor and the low-pressure turbine rotate at a first rotational speed.

More specifically, a drive shaft is coupled to the low-pressure turbine, and a gearbox coupled between the drive shaft and the fan assembly such that the fan assembly rotates at a second rotational speed that is different and/or less than the first rotational speed. To facilitate absorbing thrust loads, a first thrust bearing assembly is coupled between the drive shaft and the gearbox such that the thrust loads generated by the gearbox are transferred to ground, and a second thrust bearing assembly between the gearbox and the fan assembly such that the thrust loads generated by the fan assembly are transferred to ground.

During operation, as drive shaft 31 rotates, drive shaft extension 70 causes gearbox input 104 to rotate in first rotational direction 60, which subsequently rotates gearbox out-put 106 in opposite second rotational direction 62. Because gearbox output 106 is coupled to fan assembly 12, drive shaft 31 causes fan assembly 12 to rotate via gearbox 100 in opposite second direction 62, i.e. in an direction that is opposite from the rotational directions of both low-pressure turbine 20 and booster 22. In one embodiment, gearbox 100 is located within a sump 170 such that lubrication fluid within the sump may be utilized to lubricate at least portions of gearbox 100. For example, during operation, gearbox 100 is continuously lubricated within sump 170.

The gas turbine engine assembly described herein includes a booster compressor that is coupled directly to the low-pressure turbine via a drive shaft to enable the booster compressor to operate at a rotational speed that is greater than the rotational speed of the fan assembly. Moreover, that gas turbine engine assembly includes a gearbox coupled between the low-pressure turbine and the fan assembly. As a result, the rotational speeds of both the fan assembly and the booster compressor can be optimized. Specifically, the speed of the fan assembly can be reduced to optimize the airflow produced by the fan assembly, and the speed of the booster compressor can be increased to optimize the booster compressor stage count and drive the turbine stage count lower. As a result, the fan booster is driven at the low-pressure turbine speed thus reducing booster stage count and increasing turbine efficiency which may be used for power extraction in an electric accessory aircraft.

Exemplary embodiments of a gas turbine engine assembly and methods of assembling the gas turbine engine assembly are described above in detail. The assembly and method are not limited to the specific embodiments described herein, but rather, components of the assembly and/ or steps of the method may be utilized independently and separately from other components and/or steps described herein. Further, the described assembly components and/or the method steps can also be defined in, or used in combination with, other assemblies and/or methods, and are not limited to practice with only the assembly and/or method as described herein.

While the invention has been described in terms of various specific embodiments, those skilled in the art will recognize that the invention can be practiced with modification within the spirit and scope of the claims.

What is claimed is:

[1. A method of assembling a gas turbine engine assembly, said method comprising:

providing a core gas turbine engine including a high-pressure compressor, a combustor, and a turbine;

coupling a low-pressure turbine axially aft of the core gas turbine engine;

coupling a fan assembly axially forward of the core gas turbine engine; and coupling a booster compressor to the low-pressure turbine; and coupling the fan assembly to the booster compressor via a gearbox and a drive shaft such that, upon rotation of the drive shaft in a first rotational direction, the booster compressor and the low-pressure turbine rotate in the first rotational direction at a first rotational speed and the fan assembly rotates in a second rotational direction at a second rotational speed, the first rotational direction different than the second rotational direction, the first rotational speed greater than the second rotational speed.]

[2. A method in accordance with claim 1 further comprising:

wherein coupling the fan assembly to the booster compressor via a gearbox comprises coupling the gearbox between the driveshaft and the fan assembly.]

[3. A method in accordance with claim 2 further comprising coupling a first thrust bearing assembly between the drive shaft and the gearbox such that thrust loads generated by the low-pressure turbine and the booster compressor are transferred to ground.]

[4. A method in accordance with claim 2 further comprising coupling a second thrust bearing assembly between the gear-box and the fan assembly such that thrust loads generated by the fan assembly are transferred to ground.]

[5. A method in accordance with claim 2 wherein coupling a gearbox further comprises providing the gearbox with a substantially toroidal cross-sectional profile between the fan assembly and the drive shaft such that the gearbox substantially circumscribes the drive shaft.]

[6. A method in accordance with claim 1 further comprising:

coupling a gearbox to the fan assembly; and coupling a flex connection between the drive shaft and the gearbox.]

[7. A method in accordance with claim 1 wherein coupling a booster compressor to the low-pressure turbine further comprises coupling the booster compressor to the low-pressure turbine with the booster compressor including a predetermined quantity of compressor stages that is based on a compression ratio of the fan assembly and an overall compression ratio of the gas turbine engine assembly.]

[8. A method in accordance with claim 1 wherein coupling a booster compressor to the low-pressure turbine further comprises providing the booster compressor with less than four booster stages.]

9. A turbine engine assembly comprising:

a core gas turbine engine comprising a high-pressure compressor, a combustor, and a high-pressure turbine *coupled together in a serial flow relationship*;

a low-pressure turbine coupled *to a drive shaft and located* axially aft of [said] *the* core gas turbine engine; [a fan assembly coupled axially forward of said core gas turbine engine; and]

a booster compressor coupled to [said] *the* low-pressure turbine *via the drive shaft and a shaft extension*; [and]

*the shaft extension having a forward end coupled to the booster compressor and a rear end coupled to the drive shaft by a plurality of splines;*

*an epicyclic gearbox with an output and an input, the input being coupled to the shaft extension;* a fan assembly *coupled axially forward of the core gas turbine engine, the fan assembly being* coupled to [a] *the* booster compressor via [a] *the epicyclic* gearbox and *the shaft extension coupled to the* drive shaft*;*

*a sump within which the epicyclic gearbox is located such that lubrication fluid in the sump lubricates at least portions of the epicyclic gearbox;*

*a pair of labyrinth seals positioned between the booster compressor and the sump to facilitate sealing an upstream side of the booster compressor from the sump;*

*a first thrust bearing assembly aft of the epicyclic gearbox, the first thrust bearing assembly being mounted between the shaft extension and a frame of the core gas turbine engine;*

*a second thrust bearing assembly forward of the epicyclic gearbox, the second thrust bearing assembly being positioned between the fan assembly and the output of the epicyclic gearbox; and*

*the first thrust bearing assembly further comprising an inner race radially positioned between the shaft extension and an outer race, the inner race being configured to rotate about a longitudinal axis of the turbine engine assembly and the outer race being coupled to the frame*[such that],

*wherein the epicyclic gearbox is coupled between the shaft extension and the fan assembly, and* upon rotation of [said] *the* drive shaft in a first rotational direction, [said] *the* booster compressor and [said] *the* low-pressure turbine rotate in the first rotational direction at a first rotational speed and [said] *the* fan assembly rotates in a second rotational direction at a second rotational speed, the first rotational direction different than the second rotational direction, the first rotational speed greater than the second rotational speed,

*wherein the shaft extension is coupled to the booster compressor forward of a forward end of the drive shaft.*

[10. A turbine engine assembly in accordance with claim 9 wherein said gearbox is coupled between said drive shaft and said fan assembly.]

[11. A turbine engine assembly in accordance with claim 10 further comprising a first thrust bearing assembly coupled between said drive shaft and said gearbox and configured to transfer thrust loads generated by said low-pressure turbine and said booster compressor to ground.]

[12. A turbine engine assembly in accordance with claim 10 further comprising a second thrust bearing assembly coupled between said gearbox and said fan assembly and configured to transfer thrust loads generated by said fan assembly to ground.]

[13. A turbine engine assembly in accordance with claim 10 wherein said gearbox has a substantially toroidal cross-sectional profile and substantially circumscribes said drive shaft.]

[14. A turbine engine assembly in accordance with claim 10 further comprising a frame configured to support said fan assembly and said gearbox, said frame configured to carry said fan assembly radial, thrust, and overturning moment to an outer engine structure and mounts.]

[15. A turbine engine assembly in accordance with claim 9 further comprising:

a flex connection coupled between said drive shaft and said gearbox.]

[16. A turbine engine assembly in accordance with claim 9 wherein said booster compressor comprises a predetermined quantity of compressor stages that is based on a compression ratio of said fan assembly and an overall compression ratio of said gas turbine engine assembly.]

*17. The turbine engine assembly of claim 9, wherein the booster compressor has less than four stages of rotor blades.*

*18. The turbine engine assembly of claim 17, wherein the booster compressor has two stages of rotor blades.*

*19. The turbine engine assembly of claim 9, wherein the low-pressure turbine has four stages.*

*20. A turbine engine assembly comprising:*

*a core gas turbine engine comprising a high-pressure compressor, a combustor, and a high-pressure turbine coupled together in a serial flow relationship;*

*a low-pressure turbine coupled to a drive shaft and located axially aft of the core gas turbine engine, the low-pressure turbine having four stages;*

*a fan assembly coupled to a frame and located axially forward of the core gas turbine engine;*

*a booster compressor coupled to the low-pressure turbine via the drive shaft and a shaft extension, the booster compressor having less than four stages;*

*the shaft extension having a forward end coupled to the booster compressor and a rear end coupled to the drive shaft by a plurality of splines, the shaft extension being positioned radially outward of the drive shaft;*

*a cone with a forward end and an aft end, the forward end of the cone being coupled to the forward end of the shaft extension and the aft end of the cone being coupled to a rotor disk of the booster compressor; and*

*an epicyclic gearbox with an input coupled to the shaft extension;*

*wherein the fan assembly is coupled to the booster compressor via the epicyclic gearbox and the shaft extension coupled to the drive shaft, and*

*wherein upon rotation of the drive shaft in a first rotational direction, the booster compressor and the low-pressure turbine rotate in the first rotational direction at a first rotational speed and the fan assembly rotates in a second rotational direction at a second rotational speed, the first rotational direction different than the second rotational direction, the first rotational speed greater than the second rotational speed.*

*21. The turbine engine assembly of claim 20, further comprising at least one roller element mounted between an output of the epicyclic gearbox and the frame.*

*22. The turbine engine assembly of claim 20, wherein the booster compressor has two stages.*

*23. The turbine engine assembly of claim 20, further comprising a first thrust bearing assembly mounted to the shaft extension,*

*wherein the forward end of the cone is coupled to the forward end of the shaft extension at a location forward of the first thrust bearing assembly.*

*24. A turbine engine assembly comprising:*

*a core gas turbine engine comprising a high-pressure compressor, a combustor, and a high-pressure turbine coupled together in a serial flow relationship;*

*a low-pressure turbine coupled to a drive shaft and located axially aft of the core gas turbine engine, the low-pressure turbine having four stages;*

*a fan assembly coupled axially forward of the core gas turbine engine;*

*a booster compressor coupled to the low-pressure turbine via the drive shaft and a shaft extension coupled to the drive shaft;*

*an epicyclic gearbox with an input coupled to the shaft extension;*

*a sump within which the epicyclic gearbox is located such that lubrication fluid in the sump lubricates at least portions of the epicyclic gearbox; and*

*a pair of labyrinth seals that facilitate sealing an upstream side of the booster compressor from the sump;*

*wherein the fan assembly is coupled to the booster compressor via the epicyclic gearbox and the shaft extension coupled to the drive shaft, and*

*wherein upon rotation of the drive shaft in a first rotational direction, the booster compressor and the low-pressure turbine rotate in the first rotational direction at a first rotational speed and the fan assembly rotates in a second rotational direction at a second rotational speed, the first rotational direction different than the second rotational direction, the first rotational speed greater than the second rotational speed.*

*25. The turbine engine assembly of claim 24, wherein the booster compressor has less than four stages of rotor blades.*

*26. The turbine engine assembly of claim 24, wherein the booster compressor has two stages of rotor blades.*

* * * * *